United States Patent [19]

Urry

[11] Patent Number: 5,079,106
[45] Date of Patent: Jan. 7, 1992

[54] AIR ASSISTED ALKALINE CELLS

[75] Inventor: Lewis F. Urry, Columbia Station, Ohio

[73] Assignee: Eveready Battery Company, Inc., St. Louis, Mo.

[21] Appl. No.: 477,418

[22] Filed: Feb. 9, 1990

[51] Int. Cl.$^5$ .................. H01M 4/90; H01M 12/08
[52] U.S. Cl. ........................ 429/27; 429/40; 252/182.1
[58] Field of Search ............ 429/27, 40, 224; 252/182.1

[56] References Cited

U.S. PATENT DOCUMENTS

| | | | |
|---|---|---|---|
| 4,121,018 | 10/1978 | Kocherginsky et al. | 429/27 |
| 4,433,035 | 2/1984 | Wiacek | 429/27 |
| 4,595,643 | 6/1986 | Koshiba et al. | 429/27 |
| 4,608,279 | 8/1986 | Schumm | 429/224 |
| 4,892,637 | 1/1990 | Sauer et al. | 429/40 X |

Primary Examiner—Stephen J. Kalafut
Attorney, Agent, or Firm—Robert W. Welsh

[57] ABSTRACT

An air assisted alkaline cell having a cathode made from a mixture of porous manganese dioxide and substantially less porous manganese dioxide. The substantially solid $MnO_2$ is the major component of the cathode with the porous $MnO_2$ being present in an amount effective to enable recharging of the cathode of the air assisted alkaline cell in the presence of air. The composition of the cathode is disclosed as well as the method of making the cathode. An improved air assisted alkaline cell is also disclosed, as well as the method for making the improved air assisted cell.

19 Claims, 3 Drawing Sheets

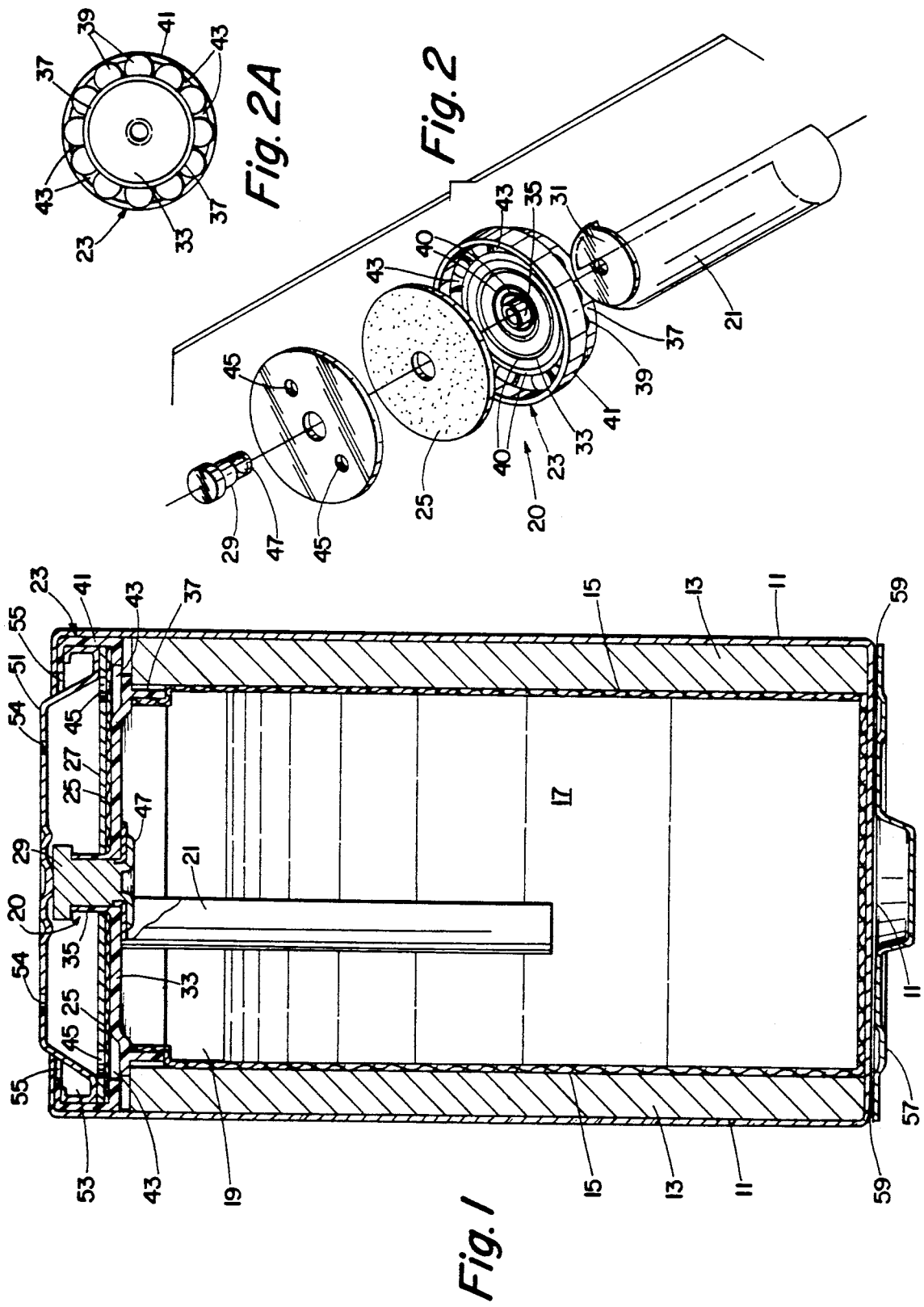

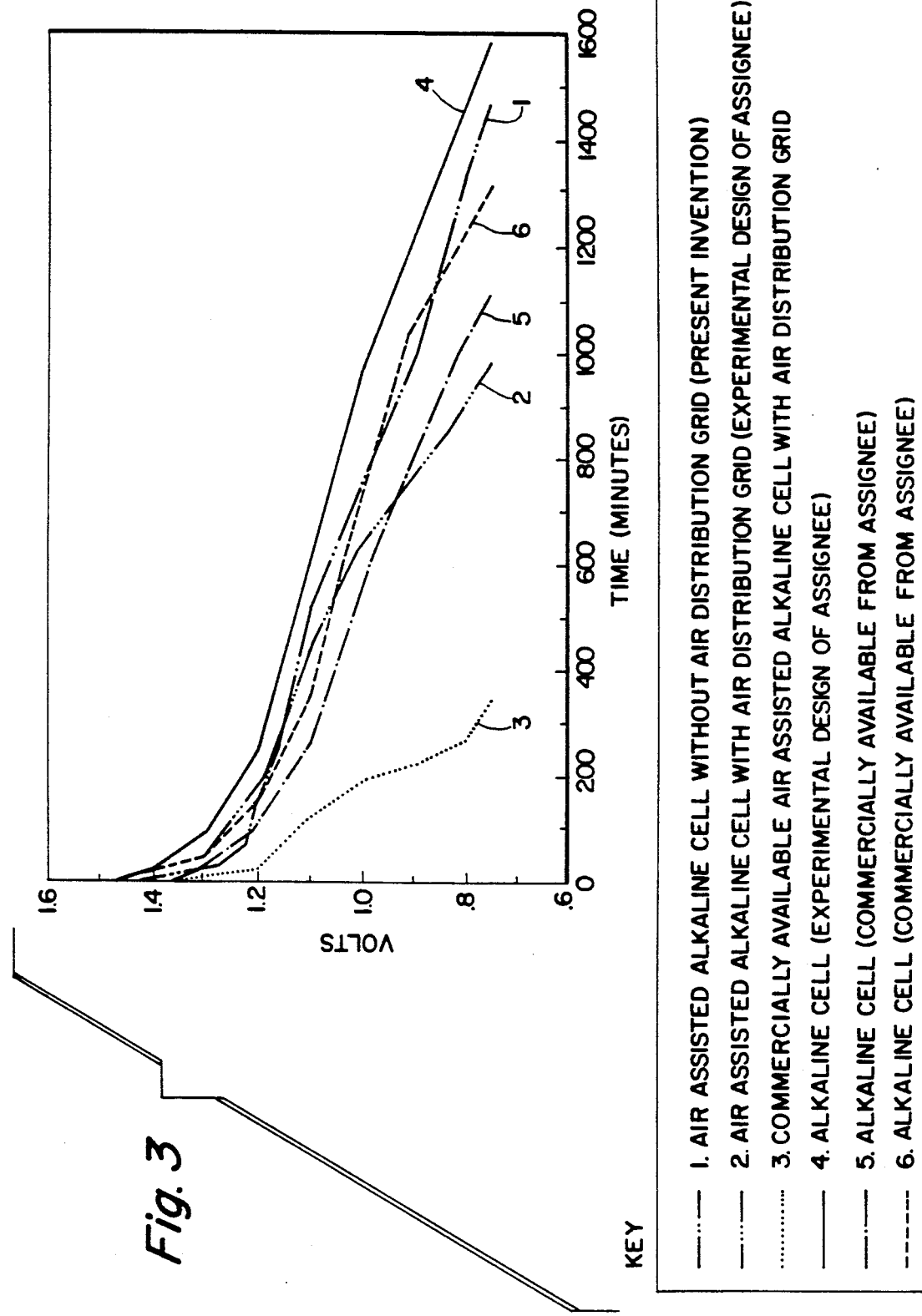

AIR ASSISTED ALKALINE CELLS

BACKGROUND OF THE INVENTION

The present invention relates to air assisted alkaline cells.

Alkaline cells are well known in the art. A conventional alkaline cell employs a zinc anode, manganese dioxide as the cathode with an aqueous solution of potassium hydroxide for the electrolyte. These cells are readily available commercially for industrial and home applications.

Recently a new type of alkaline cell was disclosed by Cegasa International, a Spanish company. It is an air assisted cell employing zinc as the anode and manganese dioxide as the cathode with an aqueous solution of potassium hydroxide as the electrolyte. The cell is designed so that the positive electrode containing the manganese dioxide ($MnO_2$) is supported about its periphery and along its full length in the cell by a perforated ribbed air distribution grid. The bottom or negative end of the cell has an insulating support which allows air to enter the cell and pass up along the outside of the supported positive electrode. When the cell is initially put into a circuit, the electro-chemical reaction depends primarily upon the presence of the manganese dioxide cathode. As the reaction progresses, and the manganese dioxide cathode is electrochemically reduced, air within the cell reoxidizes and recharges the manganese dioxide.

While the Cegasa cell does function for its intended purpose, it is a complex cell in that it requires a cathode support completely surrounding the cathode for exposing the surface of the cathode to air. Also, the interior of the cell has a complex pattern of supports and air distribution passages to allow air to enter the cell and contact the $MnO_2$.

As mentioned previously, the Cegasa air assisted alkaline cell employs manganese dioxide as the active cathode material. There is no teaching in any of the Cegasa literature presently known to the inventor that the manganese dioxide used is anything other than conventional electrolytically deposited manganese dioxide which is typically used in alkaline cells. The Cegasa literature shows no awareness of any improvement to be gained through the use of mixtures of different types of manganese dioxide.

SUMMARY OF THE INVENTION

In accordance with the present invention, an improved air assisted alkaline cell has been prepared which does not require the presence of an air distribution grid which is expensive and which occupies space within the cell that otherwise could be occupied by active material to increase the energy capacity of the cell. The improved cell therefore has increased continuous drain service in an air free environment because of an increase in amount of $MnO_2$ in the cell. Likewise, it has improved energy capacity in the presence of air due to an increased amount of zinc in the cell. The improved air assisted alkaline cell employs a mixture of highly porous manganese dioxide and substantially solid manganese dioxide.

The present invention includes in one embodiment a composition suitable for use in the manufacture of a cathode for an air assisted alkaline cell comprising a mixture of highly porous $MnO_2$ and substantially solid $MnO_2$ with the highly porous $MnO_2$ being present in an amount effective to enable recharging of the cathode prepared from the mixture when used in an air assisted alkaline cell in the presence of air and with the substantially solid $MnO_2$ being present in an amount to produce an acceptable alkaline cell in the absence of air. The invention also includes a cathode prepared from the mixture, as well as the method of preparing the cathode, an air assisted alkaline cell incorporating the cathode and the method of manufacturing the air assisted alkaline cell.

BRIEF DESCRIPTION OF THE DRAWINGS

FIG. 1 is a sectional view of an inverted air assisted alkaline cell of the present invention;

FIG. 2 is an exploded view of the subassembly used in assembling the cell;

FIG. 2a is a plan view of the air permeable seal member used in the subassembly of FIG. 2;

FIG. 3 is a series of curves generated through the continuous discharge of several different cells.

DETAILED DESCRIPTION OF THE PREFERRED EMBODIMENTS

Figure 4:
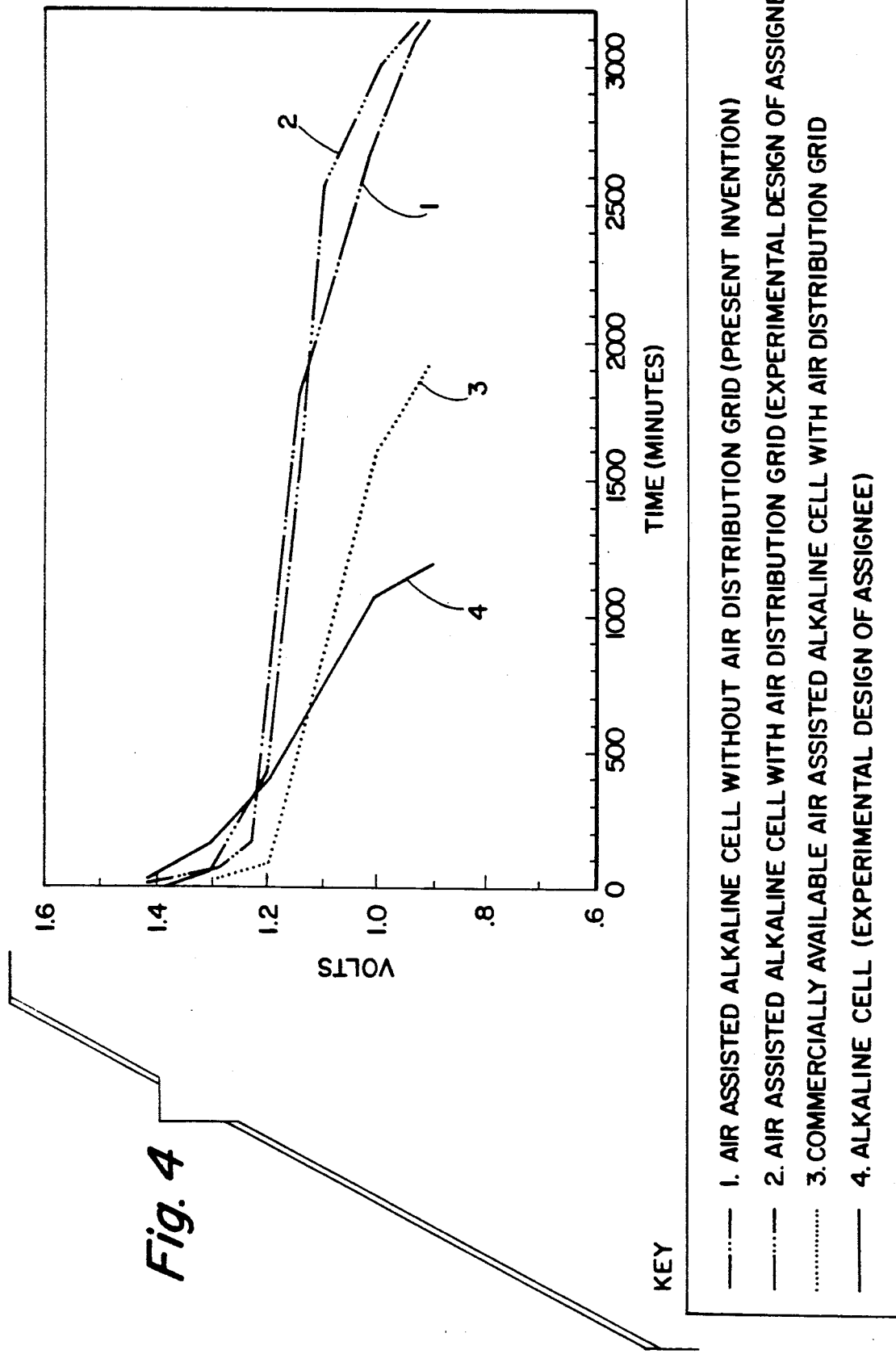
FIG. 4 is a series of curves generated through the intermittent discharge of several different cells.

Referring to FIG. 1, the air assisted alkaline cell is assembled in a conventional conductive steel container 11 which also forms an external terminal for the cell. The cathode for the cell 13 is a mixture of highly porous manganese dioxide and substantially solid manganese dioxide. The mixture is prepared in a conventional mixer.

A good source of highly porous manganese dioxide is so-called chemically synthesized manganese dioxide or CMD. CMD is usually marketed with a porosity of 25% to 35%. However, CMD can be prepared in the form of very porous spheres having a porosity of approximately 60%. The porous spheres have a substantial amount of surface available for reaction with oxygen in an air assisted cell. If a cell were prepared using CMD as the only active cathode material the total energy capacity of the cell would be lowered due to the decrease in the amount of $MnO_2$ available per unit volume of cathode.

In order to increase the total energy capacity of the cell in an air free environment, substantially solid $MnO_2$ must be available for the cell reaction. A good source of substantially solid $MnO_2$ is electrolytically deposited $MnO_2$ or EMD. EMD can be obtained in the form of dense particles after the electrolytically deposited material is stripped from the electrodes, crushed and screened. EMD has a porosity of approximately 10%-16% and therefore is a substantially solid material.

Since CMD and EMD are both porous materials with CMD being substantially porous while EMD is substantially solid, the terms CMD or highly porous and EMD or substantially solid will be used to characterize the materials in this specification.

The use of CMD and EMD in the manufacture of cathodes for dry cells has been known for many years. CMD and EMD have each been mixed with naturally occurring manganese dioxide to form cathodes. To date, the inventor is aware of no one mixing CMD and EMD for use in the cathode of an air assisted alkaline cell and of the inventive results obtained through the use of a mixture of these materials.

Since in the operation of an air assisted cell the $MnO_2$ is regenerated, only sufficient highly porous $MnO_2$ is necessary to provide good rechargeability of the $MnO_2$ in the presence of air. In order to increase the total energy capacity of the cell, EMD can be added to supply additional active cathode material. As the ratio of EMD to CMD increases, the cell's air free capacity also increases. The amount of CMD and EMD used in the cathode of the cell depends on the desired parameters of the cell with, for example, more or less CMD being used per cathode depending on the energy capacity desired in the presence of air. For a good cell capacity in an air free environment and good rechargeability in an environment containing air, a mixture of 1:5, that is, one part by weight of CMD to five parts by weight of EMD is preferred.

While CMD is a good source of highly porous manganese dioxide, other sources are available now and will be available in the future; therefore, the present invention is not so limited. Likewise, EMD is a readily available source of bulk, substantially solid, manganese dioxide, however, other sources are available including naturally occurring manganese dioxide, and even conventionally available low porosity CMD, and, therefore, the present invention is not limited to EMD.

The CMD and EMD are added to the mixer along with a small amount of Teflon, approximately 0.6% by weight of an aqueous solution, which is used to selectively wetproof the cathode and to improve the stability of the formed electrode structure. Teflon is a trademark of DuPont and is used to identify polytetrafluoroethylene polymeric materials. The selective wetproofing of the $MnO_2$ keeps some of the CMD surface available for contact with air so that the $MnO_2$-air-electrolyte junction needed for rechargeability is achieved in the finished cell. After thoroughly mixing the components, the cathode composition is poured into a steel container for the cell. An impact extruder is used to load the cell container with the cathode material. Under the pressure of the impact extruder, the cathode material becomes tightly packed about the walls of the container, with the Teflon serving to bind the mixture into a compact mass. It has been observed in the manufacture of the cells that a porosity gradient is formed in the manganese dioxide in the cathode, with the highest packing density being at the bottom of the container and with the lowest packing density at the top. The top of the cathode is not as tightly packed as the bottom and, in turn, more of the CMD/EMD mixture is exposed to air access at the top. The packing density of the material at the top of the formed cathode is approximately 70% while the packing density at the bottom is approximately 100%.

It is very important in the operation of the cathode for the air assisted alkaline cell of the present invention that some of the $MnO_2$ be exposed simultaneously to a conductor, to electrolyte and to air. In the Cegasa cell this was achieved through the use of the air distribution grid. No such grid is used or required in the inventive cell with the highly porous $MnO_2$ providing a surface area of $MnO_2$ and air paths into the top of the cathode for the recharging of the air assisted cell while the substantially solid $MnO_2$ provides the bulk presence of manganese dioxide for the conventional operation of the alkaline cell.

CMD can be prepared starting with manganese ore which is first converted to a nitrate which is then treated with ammonium carbonate and chemical oxidants to form manganese carbonate. The manganese carbonate, after washing, is roasted in the presence of oxygen and chemical oxidants to form manganese dioxide which is purified by washing to obtain the battery grade manganese dioxide material. The preferred CMD used in the preparation of the cathode of the air assisted cell is a material obtained from Sedema which is a division of Sadacam S.A. of Brussels, Belgium. The material is identified by Sedema as Sedema TR manganese dioxide. The material has a porosity of approximately 60%. The EMD is obtained from the electrolytic deposition of manganese dioxide and is supplied by the assignee of the instant application. The EMD can also be purchased from commercial suppliers. When the materials are combined in a homogeneous mixture, and then added to the container to form the cathode, the preferred average porosity for the cathode is 20%. CMD has a porosity of approximately 0.13 cc/g while EMD has a porosity of approximately 0.022 to 0.035 cc/g.

After the cathode is formed in the container, a separator 15 is added to electrically isolate the anode material from the cathode and the container while still permitting ion transport between the electrodes. The anode material 17 is then added to the separator lined cavity of the cell. The anode material comprises a mixture of zinc powder, a gel forming binder and the liquid electrolyte used in the cell. The preferred binder is Carbopol 934 which is a carboxy polymethylene polymer available from the B. F. Goodrich Company, of Cleveland, Oh.

In an air assisted cell, the discharged active cathode, that is the manganese dioxide, undergoes a reaction with the air in the cell and with air which can enter the cell to become recharged, reoxidizing the reduced manganese oxide to manganese dioxide. In the discharge of the alkaline cell, the manganese dioxide is reduced to a lower oxidation state. The oxygen in the air will spontaneously restore or regenerate the higher oxidation state over a period of time. If the cell is subjected to brief periods of high rate discharge, then the cell must be rested for substantial periods of time between each discharge to enable the air to completely recharge the $MnO_2$. However, if the cell is continuously discharged at a rate which is less than the rate at which the $MnO_2$ is recharged by the incoming air, then the air recharges the $MnO_2$ as quickly as it is discharged. In other words, regardless of the rate at which the cell is discharged, if the cell is drained at a low rate or is rested for a sufficient period of time, then the cathode's ability to be recharged is limited only by its access to air. The cathode material is regenerated without involving the zinc anode material. The zinc is oxidized during the discharge but it cannot be regenerated during a rest period. In view of this, less cathode material needs to be added to an air assisted alkaline cell and, in turn, the volume of zinc can be increased in the cell to increase the overall capacity of the cell.

Returning again to a discussion of FIG. 1, the alkaline electrolyte solution is approximately a 34% to 37% by weight solution of potassium hydroxide in water. The electrolyte from the anode mixture 17 permeates the separator 15, and the cathode 13. An open area 19 is left in the cell to provide room for expansion of the anode mixture 17.

A subassembly indicated generally by the number 20, referring to FIG. 2, is used to close the cell. The subassembly consists of an anode current collector 21, a seal member 23, an air permeable gasket 25, a neutral cover 27 and a rivet 29 which is used to join the several pieces together.

The anode current collector 21 is made from an electrically conducting metal that is inert to the cell's caustic environment. The collector metal preferably is sheet brass. The anode current collector 21 is rolled to have an arcuate shape. The sheet metal is folded over to form a flat surface which fits tightly against the bottom of the seal member 23. A nail shaped collector is also suitable.

Referring to FIG. 2A, the seal member 23 is made of an organic polymeric material which is compatible with the several components of the cell. The preferred material is polypropylene. The seal member 23 has a substantially flat bottom portion 33 surrounding a sleeve 35. Below and in line with the periphery of the bottom portion 33 is a substantially circular projecting first wall portion 37. A plurality of circumferentially spaced spokes 39 extend from the periphery of the bottom portion 33 out to and below a second wall portion 41 extending upwardly away from bottom portion 33. The spaces 43 between the spokes 39 provide a passage for air to pass through the seal member 23.

A membrane 25 fits within the area of the seal member 23 bounded by the wall 41. The membrane is made of two layers of Teflon. One layer is a nonwoven film and the other is a mesh. The two layers are heat sealed together and form an air permeable membrane for the cell. The gasket 25 can be fastened to the bottom 33 and the spokes 39 by welding. A fatty polyamide adhesive such as the type disclosed in Winger U.S. Pat. No. 3,922,178 can be used to backup the weld and to prevent electrolyte creep between the polypropylene seal and the microporous gasket. Two beads of the adhesive can be used. One bead is placed around the periphery of the bottom 33 where it joins the inside of the wall 41. The second bead can be placed on the bottom 33 where it joins the outer wall of the sleeve 35.

To further ensure that the microporous gasket 25 stays in position, concentric raised ridges 40 can be formed on the bottom 33 of the seal 23. The gasket 25 will then be clamped between the ridges on the bottom 33 and the neutral cover 27.

The vented neutral cover 27 is preferably made of stainless steel and has a pair of spaced apertures 45 therein to allow the passage of air into the cell. The vented cover 27 will fit within the area of the seal member 23 bounded by the wall 41.

The rivet 29 is preferably made of brass and has a thinned portion 47 which can be easily spread to bind all of the parts of the subassembly 20 together.

The dimensions of the several components of the subassembly 20 and of the overall cell can be varied to meet particular size requirements for the type of cell being assembled.

The subassembly 20 is inserted into the bottom of the inverted cell as shown in FIG. 1. The wall 37 moves the top edge of the separator 15 away from the cathode material 13. The wall 37 and separator 15 protect the anode material 17 from contact with the air entering the cell. This avoids the loss of zinc due to direct reaction with oxygen. The wall portion 41 of the seal assembly 23 insulates the neutral cover 27 from electrical contact with the container 11.

To complete assembly of the cell, a bottom cover 51 is placed into the steel container 11 and is also isolated from contact with the container by the wall portion 41 of the subassembly 20. The bottom cover 51 makes electrical contacts with the rivet 29, or other suitable electrically conductive means, enabling the bottom cover 51 to become the second external terminal for the cell. The edge of the steel container 11, and of the subassembly 20, are then rolled to hold the upturned portion 53 of the bottom cover 51 locked in position on the bottom of the cell. A gap 55 surrounds the bottom cover 51, separating it from contact with the container 11. The bottom cover 53 preferably contains three small apertures 54, two of which are shown in FIG. 1, spaced approximately 120° apart which provide a passage for air to enter into the bottom of the cell. The air can pass through the subassembly 20 and contact the top portion of the cathode through the air passage 43. The top cover 57 can be fastened to the container by welds 59 after the cathode is rammed into place. It can be added before or after this step as it is merely attached to the container.

Several D-size air assisted alkaline cells of the present invention were tested in 2.2 ohm continuous service tests (FIG. 3). The test results showed that the air assisted cell of the present invention (1) was better than two commercially available alkaline cells (5 and 6) and much better than a commercially available air assisted alkaline cell (3) and an experimental air assisted cell (2). The cell was not as good as an experimental alkaline cell (4). The latter result was a function of the amount of cathode material present in the cells with the CMD of the air assisted cell (1) providing less actual $MnO_2$.

Since an air assisted alkaline cell recovers some of its charge while standing between high rate pulsed discharges, a dry cell industry recognized intermittent discharge test was carried out (FIG. 4). In the standard test chosen, the test curves are generated by discharging D-size cells on a 2.2 ohm load for four minutes per hour, eight hours per day. The total discharge time per day was 32 minutes. However, the curve marked 1 was produced by discharging a D-size cell on a 2.2 ohm load for 4 minutes per hour, twenty-four hours a day. The total discharge time per day was 96 minutes. This test regime is identified by the assignee of the present invention by the initials CIT and is Continuous Intermittent Test. The impact of using the industry standard test, instead of the CIT regime, is that the cell has much more time to recover when it is tested for 32 minutes per day instead of 96 minutes per day. Therefore, one would expect that cell 1, manufactured without an air distribution grid, would provide more service when evaluated on the industry standard test instead of the CIT test. This difference in test schedules is probably the reason for the difference in performance between cell 1, without an air grid, and the cell 2 with an air grid.

In the assembly of the air assisted alkaline cell, the air holes 54 in the external electrode 51 are closed by a suitable seal tab such as that disclosed in U.S. Pat. No. 4,649,090 issued Mar. 10, 1987, to Oltman et al. The seal tab protects the interior of the cell from deleterious environmental conditions and maintains the freshness of the cell.

The preferred label material and configuration for the fully assembled cell is that disclosed in U.S. Pat. No. 4,801,514 issued Jan. 31, 1989, to Will et al. The multilayer adhesive label disclosed in the patent is particularly useful for dry cell batteries.

It can be seen from the discussion above that an improved air assisted alkaline cell is provided. The air assisted cell does not require a cathode support or air distribution grid, but instead relies on the porosity of the manganese dioxide to provide paths for air to travel into the electrode and thereby enable recharging of the $MnO_2$ to occur. The porous air distribution support is also not necessary in this cell, enabling more active materials to be employed in the same size container.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A cathode for an air assisted alkaline cell comprising:
    a mixture of a porous $MnO_2$ and a substantially solid $MnO_2$ having a packing density gradient when shaped into a cathode with the lowest packing density predominating at the portion of said cathode intended to be contacted by air during the operation of the cell.

2. A cathode for use in an air assisted alkaline cell comprising:
    a mixture of a porous $MnO_2$ and a substantially solid $MnO_2$ wherein said mixture is predominantly solid $MnO_2$ in order to provide a cell with a high ampere hour output in the absence of air.

3. A cathode for use in an air assisted alkaline cell as set forth in claim 2, wherein:
    said mixture of a porous $MnO_2$ and a substantially solid $MnO_2$ is in an approximate ratio by weight of 1:5 of porous $MnO_2$ to substantially solid $MnO_2$.

4. A cathode for use in an air assisted alkaline cell as set forth in claim 2, wherein:
    said porous $MnO_2$ is chemically prepared $MnO_2$ and said substantially solid $MnO_2$ is electrolytically prepared $MnO_2$.

5. A cathode for an air assisted alkaline cell comprising a mixture of porous $MnO_2$ and substantially solid $MnO_2$ with said porous $MnO_2$ being present in an effective amount to provide air paths into the cathode and thereby recharge the cell in the presence of air.

6. A cathode for an air assisted alkaline cell comprising a mixture of porous $MnO_2$ and substantially solid $MnO_2$ with the porous $MnO_2$ being present in an amount effective to enable recharging of a cathode prepared from said mixture when used in an air assisted alkaline cell in the presence of air and with the substantially solid $MnO_2$ being present in an amount to produce an acceptable alkaline cell in the absence of air.

7. A cathode for use in an air assisted alkaline cell as set forth in claim 6, wherein:
    said mixture of a porous $MnO_2$ and a substantially solid $MnO_2$ is in an approximate ratio by weight of 1:5 porous $MnO_2$ to substantially solid $MnO_2$.

8. A cathode for use in an air assisted alkaline cell as set forth in claim 6 wherein:
    said mixture of a porous $MnO_2$ and a substantially solid $MnO_2$ is predominantly substantially solid $MnO_2$.

9. A method for preparing a cathode for use in an air assisted alkaline cell comprising the following steps
    mixing a composition comprising porous $MnO_2$ and substantially solid $MnO_2$ with the porous $MnO_2$ being present in an amount effective to recharge said cathode in the presence of air;
    forcing said composition into a form;
    subjecting said composition to pressure while in said form to shape a cathode having a packing gradient with the lowest volume percent of solids being at one end of said cathode and the highest at the other end of said cathode.

10. A method for preparing a cathode as set forth in claim 9, wherein an impact extrusion machine is used to subject said cathode to pressure.

11. An air assisted alkaline cell comprising:
    a conductive container for supporting the components of said cell and for forming an external terminal for said cell;
    a cathode electrode in contact with the inner wall of said container, said cathode comprising a mixture of porous $MnO_2$ and substantially solid $MnO_2$ with said porous $MnO_2$ being present in an effective amount to recharge the cell in the presence of air;
    an anode electrode, said anode electrode comprising metallic zinc, a binder and an electrolyte;
    a separator for electrically isolating said cathode electrode from said anode electrode;
    an anode current collector in electrical contact with said anode electrode;
    an external terminal for said cell in contact with said anode current collector;
    an aqueous alkaline electrolyte for facilitating the electrochemical reaction in said cell; and
    an air permeable seal for closing said conductive container and for allowing oxygen to enter the cell and come in contact with said cathode electrode.

12. An air assisted alkaline cell as set forth in claim 11, wherein:
    said cathode has a packing density gradient with the lowest percentage of solids predominating at the portion of the cathode contacted by air during the operation of said cell.

13. An air assisted alkaline cell as set forth in claim 11, wherein:
    said cathode is a 1:5 mixture by weight of porous $MnO_2$ to substantially solid $MnO_2$.

14. An air assisted alkaline cell as set forth in claim 11, wherein:
    said porous $MnO_2$ is chemically prepared $MnO_2$ and said substantially solid $MnO_2$ is electrolytically deposited $MnO_2$.

15. An air assisted alkaline cell as set forth in claim 11, wherein:
    said aqueous alkaline electrolyte is an aqueous solution of potassium hydroxide.

16. A method for preparing an air assisted alkaline cell comprising the following steps:
    providing a conductive container for the cell which can serve as the first external terminal for said cell;
    preparing a mixture of porous $MnO_2$ and substantially solid $MnO_2$;
    loading said mixture of porous $MnO_2$ and substantially solid $MnO_2$ into said container to form a cathode electrode;
    adding a separator to said container to electrically isolate said cathode electrode from the anode electrode;
    adding a zinc anode composition to said container in contact with said separator; and
    providing an anode current collector and an air permeable conductive cover for said cell, said conductive cover forming the second external terminal for said cell.

17. A method for preparing an air assisted alkaline cell as set forth in claim 16, wherein:

said mixture of porous MnO$_2$ and substantially solid MnO$_2$ is mixed in a ratio which is predominantly substantially solid MnO$_2$.

18. A method for preparing an air assisted alkaline cell as set forth in claim 16, wherein:
said mixture of porous MnO$_2$ and substantially solid MnO$_2$ is mixed in a 1:5 ratio by weight of porous MnO$_2$ to substantially solid MnO$_2$.

19. A method for preparing an air assisted alkaline cell as set forth in claim 16, wherein:
said anode composition comprises a mixture of zinc powder and a binder.

* * * * *